United States Patent
Humpal

(10) Patent No.: US 6,402,051 B1
(45) Date of Patent: Jun. 11, 2002

(54) FOLD CYLINDER STRUCTURE

(75) Inventor: Richard Allen Humpal, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/698,991

(22) Filed: Oct. 27, 2000

(51) Int. Cl.[7] ............ B05B 1/20; A01G 25/09; E01C 19/16; E01H 3/02
(52) U.S. Cl. ........ 239/166; 239/165; 239/167; 239/172
(58) Field of Search ................ 239/166, 167, 239/168, 169, 159, 160, 165, 172, 161, 163

(56) References Cited

U.S. PATENT DOCUMENTS

| | | | |
|---|---|---|---|
| 5,103,172 A | | 4/1992 | Stoll .................. 324/226 |
| 5,356,260 A | | 10/1994 | Ikari et al. .......... 414/700 |
| 5,957,383 A | * | 9/1999 | Benest ............... 239/166 |
| 5,988,528 A | * | 11/1999 | Krohn et al. ........ 239/168 |
| 5,992,759 A | * | 11/1999 | Patterson ........... 239/166 |
| 6,085,993 A | * | 7/2000 | Beggs ............... 239/166 |

* cited by examiner

Primary Examiner—William C. Doerrler
Assistant Examiner—Davis Hwu

(57) ABSTRACT

A large sprayer boom includes an inner section pivotally supported from a frame for movement between an outwardly extended working position and a folded transport position by an inner fold cylinder located at a first hinge point. The boom includes an outer section pivotally connected to the outer end of the inner boom at a second hinge point and movable relative to the inner section between folded and unfolded positions by an outer fold cylinder. Each of the cylinders includes an internally mounted cylinder position sensor protected from the harsh environment encountered by an agricultural implement. The switches are connected to a fold sequence circuit which includes operator switches located adjacent the main sprayer controller switches in the sprayer cab so the operator does not have to turn away from his normal operating position to activate the folding or unfolding cycle. The inner fold cylinder proximity switch controls the extension or unfold sequence while the outer fold cylinder proximity switch controls the fold sequence. The control circuit including proximity switches and operator switches is relatively simple, inexpensive and easy to attach and operate. Various boom positions including partially unfolded positions for narrower operation can be quickly and easily established by the operator. The larger inner boom section cannot be folded until the outer boom section is first folded against the inner boom section so that stresses in the boom and boom cylinders are minimized.

23 Claims, 5 Drawing Sheets

FOLD CYLINDER STRUCTURE

BACKGROUND OF THE INVENTION

1) Field of the Invention

The present invention relates generally to folding agricultural implements and, more specifically, to a folding cylinder structure for implements such as sprayers having large folding sections which are sequentially folded between storage and transport positions.

2) Related Art

Implements such as agricultural sprayers include large folding booms which are built in sections to fold for transport and unfold for application of chemicals. The unfolded boom can be as long as 90 feet or more, and the folding and unfolding sequences must be carefully controlled to avoid excessive stresses on the boom and folding cylinders. To achieve proper sequencing, manufacturers have typically resorted to an array of position-responsive switches strategically placed near the bottom of boom joints. These switches are connected to electrohydraulic valves and to operator control switches in the sprayer cab. The switches on the boom are exposed to harsh environmental conditions which adversely affect switch operation and often result in boom fold malfunction. Troubleshooting and repairing a faulty fold system often is difficult and time consuming. In addition, the operator control switches in most sprayer cabs are located remote from other controls such as the hydro controller on hydraulically driven sprayers so the operator has to turn from the normal operating position to activate the fold sequence.

Therefore, it is an object of the present invention to provide an improved foldable boom arrangement. It is another object to provide such a structure which overcomes most or all of the aforementioned problems. It is yet another object to provide such an arrangement which is more durable, requires less maintenance and has reduced component and manufacturing costs compared to at least most previously available boom folding arrangements.

It is a further object to provide an improved foldable boom arrangement which obviates externally mounted switches on the boom. It is another object to provide such an arrangement which is more reliable and more convenient to operate than at least most previously available foldable boom arrangements. It is another object to provide such an arrangement which simplifies troubleshooting and repair.

It is still another object of the present invention to provide an improved foldable boom arrangement, particularly useful with very large folding boom implements including sprayers with working widths in excess of 90 feet, which reliably establishes proper folding sequence to reduce forces on the boom sections and folding cylinders. It is a further object to provide such an arrangement having an improved sequencing circuitry.

It is yet a further object of the invention to provide an improved cylinder and cylinder extension sensor for a foldable boom arrangement. It is another object to provide such a cylinder and sensor wherein switching elements are better protected from the harsh environment of a sprayer. It is another object to provide a compact control circuit for such a sensor supported primarily by the cylinder for ease of assembly, troubleshooting and repair.

A foldable boom arrangement or the like constructed in accordance with the teachings of the present invention includes a large boom having an inner section pivotally supported from a frame for movement between an outwardly extended working position and a folded transport position by an inner fold cylinder located at a first hinge point. The boom includes an outer section pivotally connected to the outward end of the inner boom at a second hinge point and movable relative to the inner section between folded and unfolded positions by an outer fold cylinder. Each of the cylinders includes an internally mounted cylinder position sensor which preferably is a proximity switch threaded into the cylinder and sensing the presence or absence of a magnet mounted for movement with the cylinder piston. When the cylinder rod is at the end of its stroke, the magnet projects into the sensor zone to establish a position signal. The internally mounted switch is protected from the harsh environment encountered by a sprayer, and wiring is simplified. The magnet also attracts harmful metallic contaminants in the hydraulic fluid to eliminate a source of hydraulic system wear.

The switches are connected to a fold sequence circuit which includes operator switches located adjacent the main sprayer controller switches in the sprayer cab so the operator does not have to turn away from his normal operating position to activate the folding or unfolding cycle. The inner fold cylinder proximity switch controls the extension or unfold sequence while the outer fold cylinder proximity switch controls the fold sequence. The control circuit including proximity switches and operator switches is relatively simple, inexpensive and easy to attach and operate. A substantial portion of the circuit is housed integrally with the proximity switches to greatly simplify assembly, troubleshooting and repair.

Various boom operating positions can be quickly and easily established by the operator, including fully unfolded wide field operation, and inner section unfolding only on one or both sides for narrower operation. To change from narrow operation to wider operation, the operator switch for each side is simply pressed and held until the proximity switch provides the signal that indicates the unfolded position has been achieved and hydraulic flow to the cylinders is deactivated. The larger inner boom section cannot be folded until the outer boom section is first folded against the inner boom section so that stresses on the boom and boom cylinders are minimized.

These and other objects, features and advantages of the present invention will become apparent to one skilled in the art upon reading the following detailed description in view of the drawings.

BRIEF DESCRIPTION OF THE DRAWINGS

FIG. 6 is a cross-sectional view of the base end of a folding cylinder showing the cylinder position sensor.

DETAILED DESCRIPTION OF THE DRAWINGS

Figure 1:
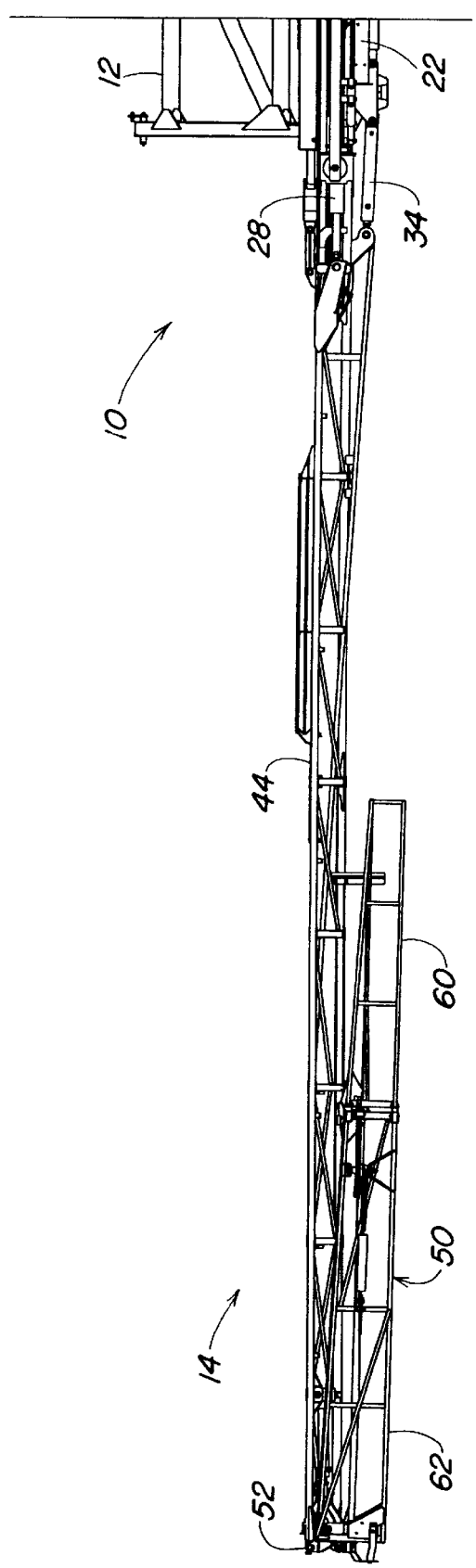
FIG. 1 is a rear view of the left-hand side of a large folding boom assembly for a sprayer.

Referring now to FIG. 1, therein is shown a portion of a sprayer boom assembly 10 connected to a support mast 12 mounted on a sprayer vehicle 13 such as the commercially available John Deere Model 4700 Sprayer having a centrally located cab 13c. The mast 12 is vertically adjustable relative to the vehicle 13 to raise and lower the boom assembly 10.

Figure 2:
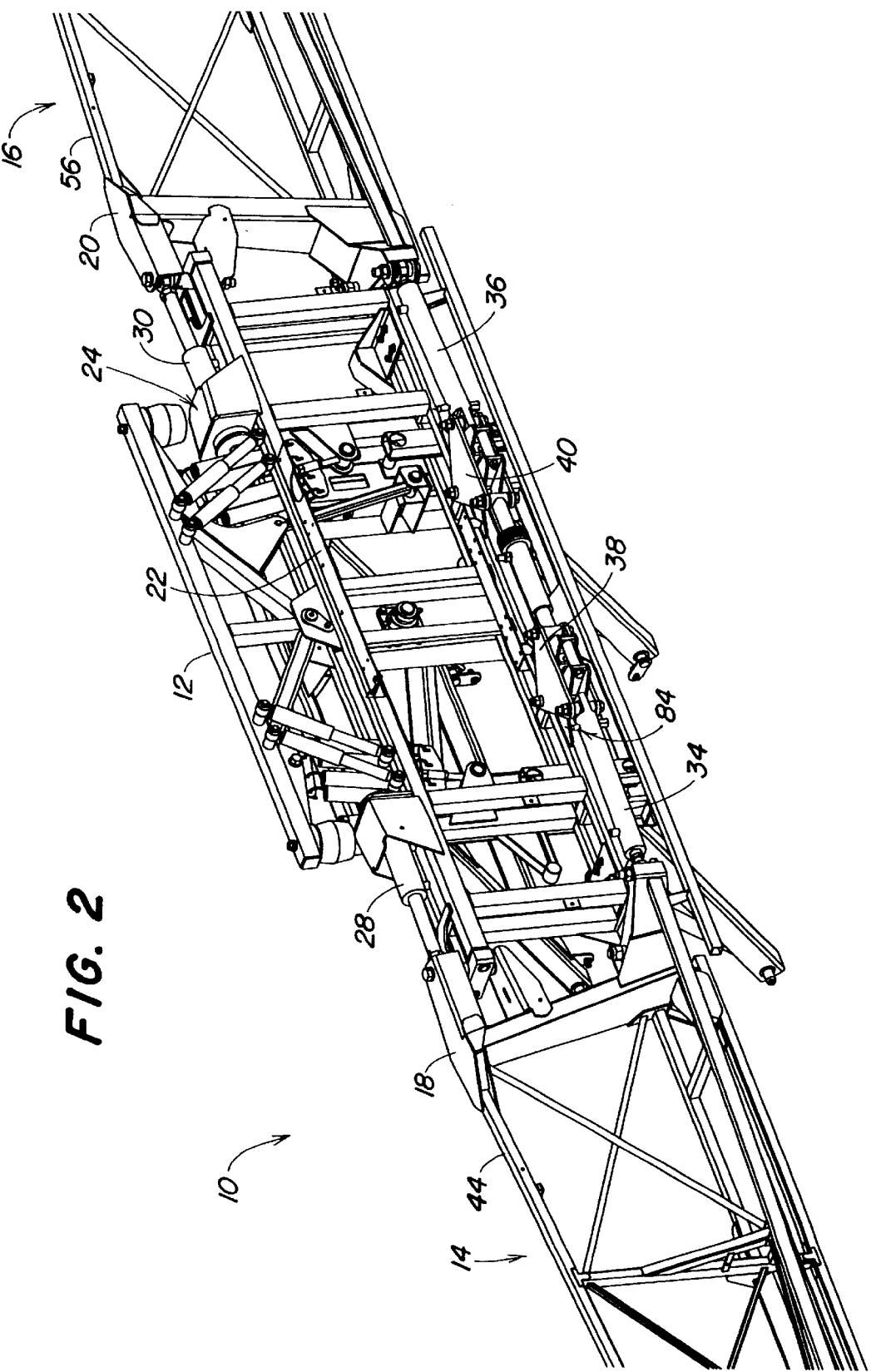
FIG. 2 is an enlarged rear perspective view of the central portion of the folding boom assembly of FIG. 1.
Figure 3:
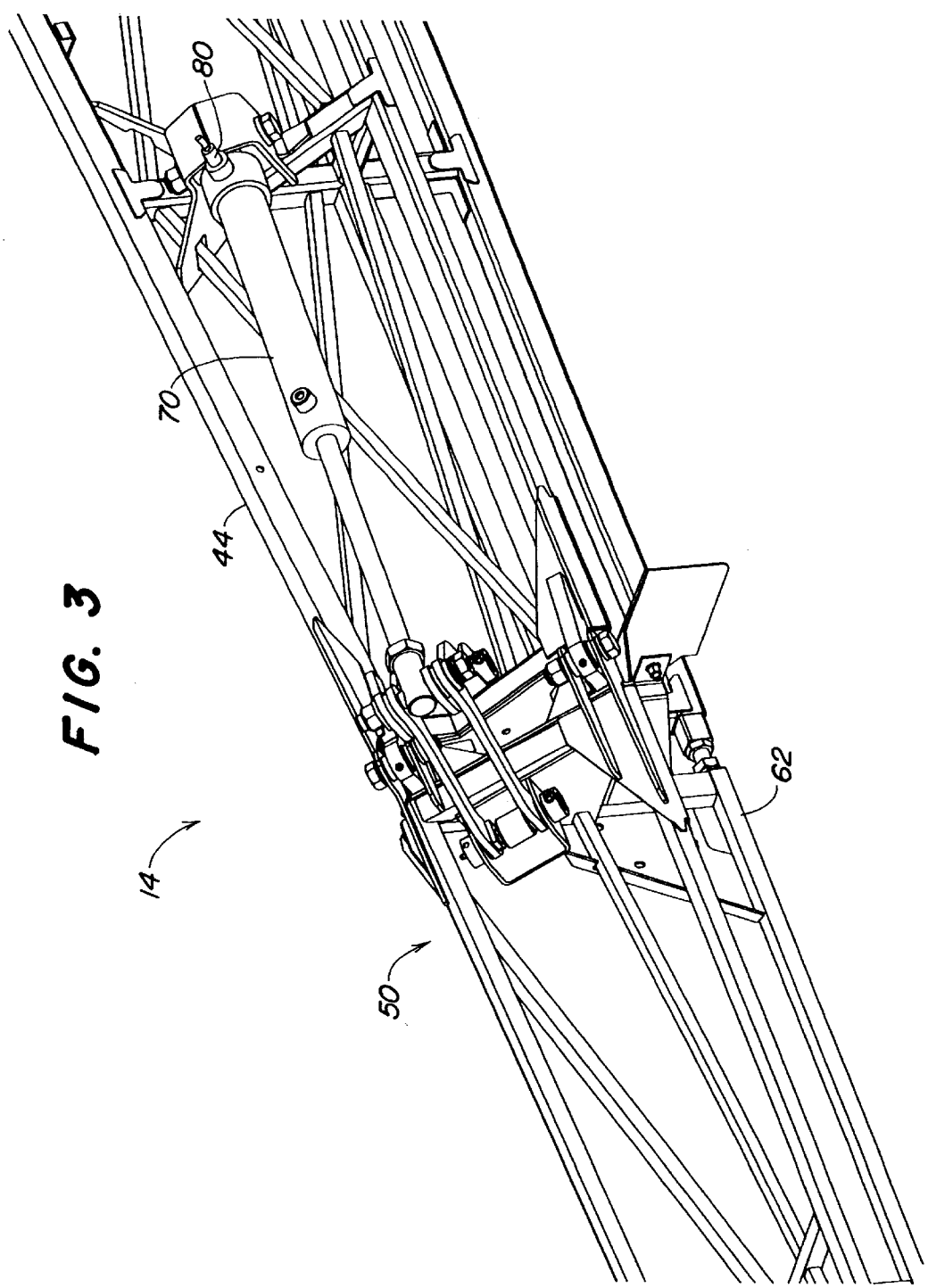
FIG. 3 is an enlarged rear perspective view of the pivot area between the inner section and adjacent outer section for the boom assembly of FIG. 1.

The boom assembly 10 includes a left-hand boom 14, and a right-hand boom 16, a portion of which is shown in FIG. 2. The right-hand boom 16 is generally identical in construction to the left-hand boom 14, and therefore only the boom 14 will be described in detail. The booms 14 and 16 include innermost ends 18 and 20 pivotally connected to outer ends of a boom support frame 22. The support frame 22 is supported rearwardly adjacent the support mast 12 by an isolation mount assembly indicated generally at 24. The axes of the pivotal connections of the booms 14 and 16 to the frame 22 are adjustable to control boom tip height using cylinders 28 and 30 connected between the top portions of the ends 18 and 20, respectively. Inner boom fold cylinders 34 and 36 are connected between central brackets 38 and 40 on the support frame 22 to move the booms 14 and 16 between extended positions (FIGS. 1, 2, 4a and 4b) and folded positions (FIG. 4c).

Figure 4:
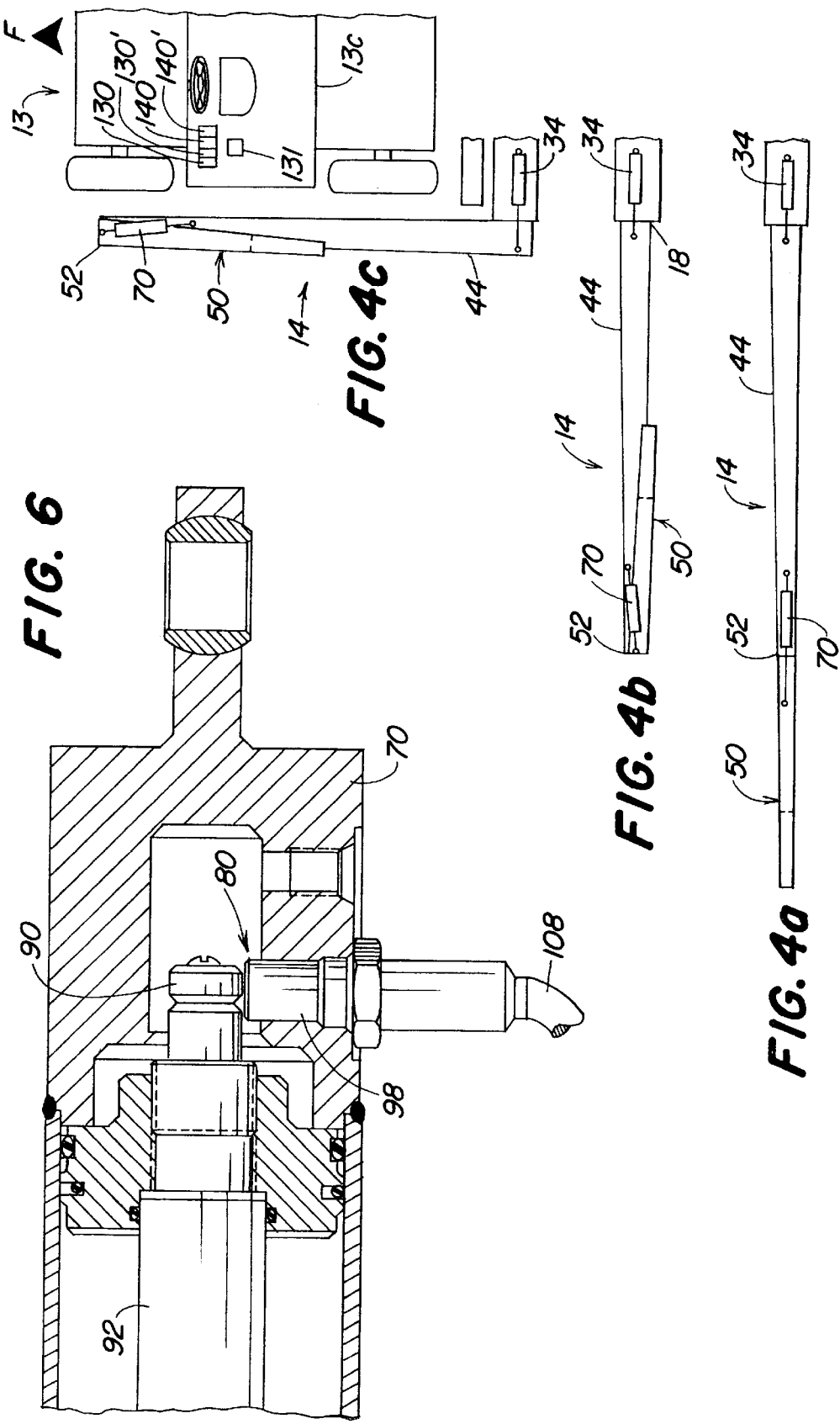
FIG. 4a is a schematic representation of the boom of FIG. 1 in the fully extended position.
FIG. 4b is a view similar to FIG. 4a but showing the boom with the outer section folded inwardly.
FIG. 4c is a view similar to FIG. 4a but showing the boom in the fully folded transport position.

The boom 14 includes an inner boom section 44 and an outer boom section 50 pivotally connected at hinge location 52 for pivoting relative to the inner boom section 44 between a folded position (FIGS. 1, 4b and 4c) and an extended position (FIG. 4a). The boom 16 includes a similar inner boom section 56 and outer boom section (not shown) which pivot in like manner to that of the boom 14. The outer boom section 50 as shown in FIG. 1 includes an outer pivoting section 60 which is spring-biased to an extended position but which can pivot relative to the remaining inner portion 62 if the end of the boom hits an obstacle while in the fully extended position (FIG. 4a).

An outer boom fold cylinder 70 is connected between the outer end of the inner boom section 44 and the inner end of the outer boom section 50. Fully extending the cylinder 70 (FIG. 4a) pivots the section 50 to the extended position relative to the inner boom section 44. To move the outer boom section 50 to the folded position (FIGS. 1, 4b and 4c), the cylinder 70 is fully retracted. When retracted (FIGS. 1, 2, 4a and 4b), the cylinders 34 and 36 move the inner booms to the unfolded position. By extending the cylinders 34 and 36, the inner booms rotate forwardly about their pivotal connections with the support frame to the folded position (FIG. 4c) adjacent the sides of the sprayer vehicle 13 and extend forwardly of the cab 13c.

The total width of the sprayer can be 90 feet or more when the sections are all fully unfolded (FIG. 4a), and the inner boom sections are approximately half the length of the outer boom sections. The folding and unfolding sequences must be carefully controlled to avoid excessive stresses on the boom and folding cylinders. Therefore, the inner boom sections 44 and 56 are not pivoted until the outer boom sections 50 are folded adjacent the corresponding inner boom sections (see FIG. 1) so that the center of gravity of each side of the boom is moved closer to inner boom section hinge area. To provide fold and unfold signals for proper boom section fold sequencing and to reduce contamination problems in the hostile environment of the sprayer 13, the cylinder 70 is fabricated with an internal cylinder position sensor 80 (FIGS. 5 and 6) which is part of the electrohydraulic circuitry (FIG. 5) for the fold sequence, and the inner fold cylinder 34 includes a similar position sensor 84 (FIGS. 2 and 5) utilized to control the unfold sequence. Only the elements for the sensor 80 will be described in detail, and the corresponding elements in the sensor 84 are numbered in like manner but designated with a prime in FIG. 5.

Each of the sensors 80 and 84 includes a magnet 90 (FIG. 6) fixed to the piston end of a cylinder rod 92. The magnet 90 projects into a cavity 94 located in the base end of the cylinder when the cylinder is fully retracted. A magnetically operated, normally closed switch 96 (FIG. 5) is contained in a cylindrically shaped threaded housing 98. The housing 98 is screwed into a threaded bore in the base end of the cylinder so that the switch 96 is located in close proximity to the magnet 90 and changes to the open state when the cylinder is fully retracted, as shown in FIG. 6.

A bootstrap relay 104 is also contained within the housing 98 and includes a control input 106 connected to the switched output terminal of the switch 96. The opposite control terminal of the relay 104 is connected to ground via cable 108 which plugs into three output terminals 98a, 98b and 98c located in the housing 98. The input terminal of the switch 96 is connected to an input terminal of relay switch 110. The switch 110 includes a first switched output terminal connected to the control input 106 and a second switched output terminal connected to the central output terminal 98b of the housing 98. The remaining output terminal of the housing 98 is connected to the input of the switch 96 and to the input of the switch 110. Therefore, when the relay 104 is activated, the relay switch moves upwardly from the position shown in FIG. 5 to connect the lower output terminal 98c of the housing 98 and the input to the switch 96 to the control input 106.

The terminal 98b of the sensor 80 is connected via cable 108 to the control input of an electrohydraulic valve 114 which controls the folding of the inner boom section 44 (i.e., the extension of the cylinder 34). When the terminal 98b is powered, the valve 114 activates to pressurize the base end of the cylinder 34 causing the cylinder to extend. The terminal 98c is connected via cable 108 to the control input of an electrohydraulic valve 120 which controls the folding of the outer boom section 50 (i.e., the retraction of the cylinder 70). Powering the terminal 98c activates the valve 120 and pressurizes the rod end of the cylinder 70 causing the cylinder to retract.

A normally open fold switch 130 located at the operator station in the cab 13 adjacent a main controller or hydro controller 131 is connected between the source of voltage on the vehicle and the terminal 98c. By depressing the switch 130, the operator activates the valve 120 and pressurizes the rod end of the outer boom cylinder 70. If the cylinder 70 is not already fully retracted and the outer boom section 50 is not fully folded, the switch 96 will be in the position shown in FIG. 5 (i.e., the magnet 90 is not adjacent the switch) so that the relay 104 activates to close the circuit between the terminal 98c and the control input 106 to bootstrap the relay 104 to the activated position for as long as the operator depresses the switch 130. Therefore, the terminal 98b is opened so that the inner cylinder fold valve 114 cannot activate to extend the cylinder 34 to move the inner boom section. Once the cylinder 79 is fully retracted so the outer boom section 50 is fully folded, the switch 96 opens. However, the relay 104 remains bootstrapped to the on position as long as the operator continues to depress the switch 130. The bootstrapping prevents powering of the terminal 98b and initiation of the folding of the inner boom section 44 until after the outer boom section is fully folded and the operator releases the switch 130 to allow the relay 104 to deactivate. Once the relay is deactivated, the terminal 98b is connected to the terminal 98c so that pushing the switch 130 initiates the folding of the inner boom section 44. Therefore, the operator cannot inadvertently begin the inner boom section folding by continuously holding down the switch 130. Inner boom folding begins only after the outer boom section 50 is fully folded and the switch 130 is released and then reactivated. This feature also helps the operator to easily establish the narrower working position shown in FIG. 4b without need for precisely releasing the switch 130 at the moment the outer boom section 50 reaches the fully folded position.

Figure 5:
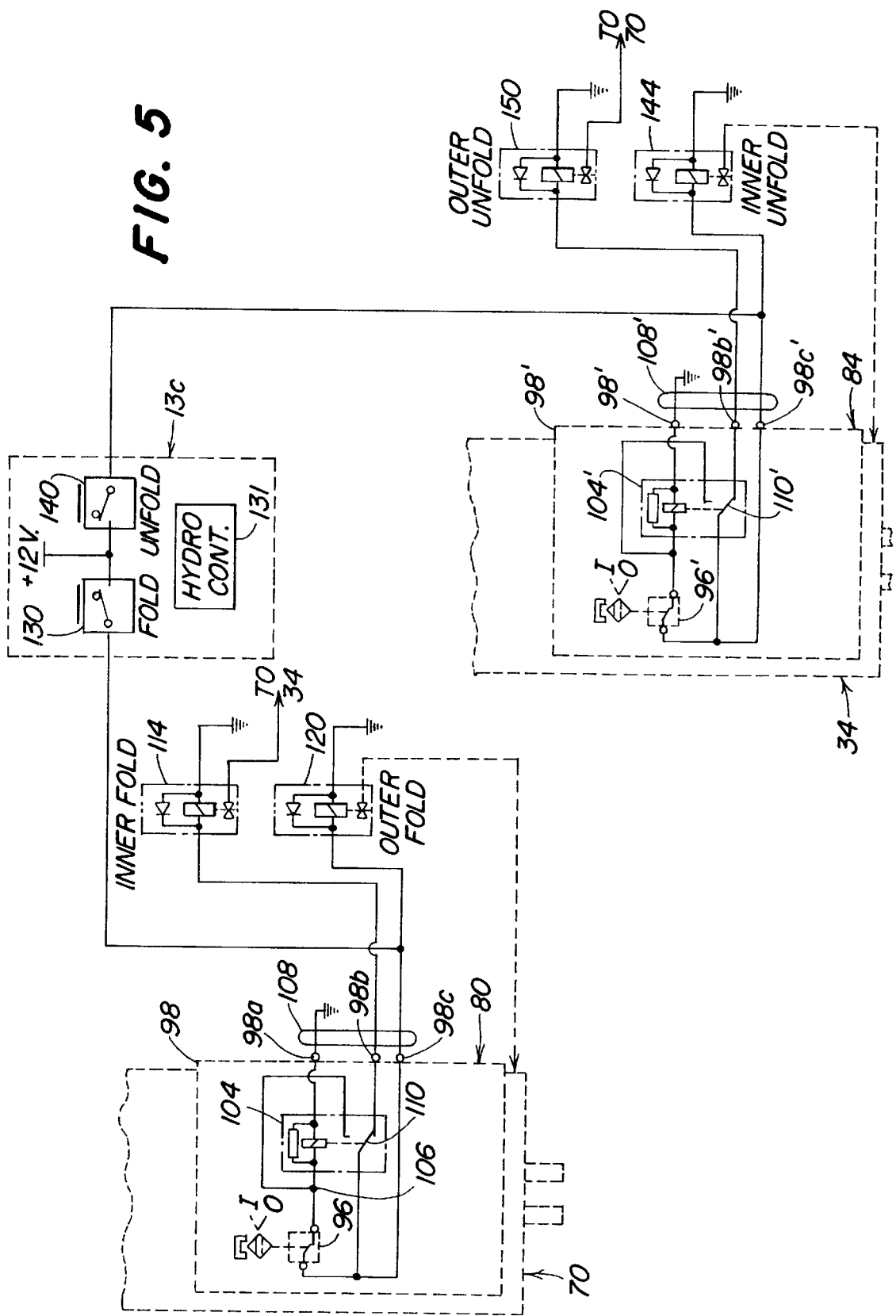
FIG. 5 is a schematic of the boom fold control circuit and the boom unfold control circuit for the boom of FIG. 1.

The boom unfold sequence is controlled by the circuit shown in FIG. 5 with control input from the sensor 84 on the inner boom section fold cylinder 34 to assure that the inner boom section 44 unfolds completely from the folded position shown in FIG. 4c before the outer boom section 50 can begin to unfold. An unfold switch 140 is located adjacent the fold switch 130 in the cab 13 and is connected to the voltage source and the terminal 98c' of the sensor 84 for the inner boom section fold cylinder 34. The control input of an inner section unfold valve 144 is also connected to the terminal 98c' and to the cylinder 34 to pressurize the rod end of the cylinder 34 when the switch 140 is depressed. The terminal 98b' is connected to the control input of an outer section unfold valve 150 to pressurize the base end of the cylinder 70 and unfold the outer boom section 50 when the terminal is powered. The outer section unfold valve 150 can only be activated if the inner boom section cylinder 34 is fully retracted (i.e., the inner boom section 44 is fully unfolded as shown in FIG. 4b). If the inner boom section cylinder 34 is not fully retracted, the switch 96' will be closed and the relay 104' will activate any time the switch 140 is depressed so that the terminal 98b' remains open and the outer unfold valve 150 remains inactivated. Once the cylinder 34 fully retracts and the inner boom section 44 reaches the fully unfolded position of FIG. 4b, the switch 96' will open. However, the relay 104' will remain bootstrapped to the on position so the outer boom section 50 will not unfold until the operator releases the switch 150 and the relay 104' drops out to connect the terminal 98b' directly to the output of the switch 140. Thereafter, depressing the switch 140 again will activate the outer unfold valve 150 to extend the cylinder 70 and unfold to outer boom section 50 to the position shown in FIG. 4a. Therefore, the operator cannot inadvertently unfold the boom beyond the position shown in FIG. 4b by continuously depressing the switch 140.

Circuitry is utilized to control the right-hand side of the boom in the same manner as that shown in FIG. 5 and described above for the left-hand side. Switches 130' and 140' (FIG. 4c) are located adjacent the switches 130 and 140 such that both sides of the boom can be controlled together or one side at a time, without need for the operator to turn from his normal operating position. Substantially all the electrical control circuitry is located within the housings 98 and 98', and the housings can be quickly disconnected from the wiring, unscrewed from the cylinders and replaced for easy diagnosis of system problems and for any necessary repair.

Having described the preferred embodiment, it will become apparent that various modifications can be made without departing from the scope of the invention as defined in the accompanying claims.

I claim:

1. A sequentially foldable boom structure for an agricultural sprayer comprising:
    a support frame;
    a first boom section pivotally connected to the support frame and movable between folded and unfolded positions;
    a first boom sensor responsive to the position of the first boom section relative to the support frame for providing a first fold signal;
    a second boom section pivotally connected to the first boom section for movement relative to the first boom section between folded and unfolded positions;
    a hydraulic cylinder connected to the second boom section for moving the second boom section between the folded and unfolded positions;
    a sensor switch located within the hydraulic cylinder and providing a second fold signal dependent upon the extension and retraction of the hydraulic cylinder, and
    electrically controlled valve structure responsive to the first and second fold signals to control the hydraulic cylinder and provide sequential folding of the second boom section relative to the first boom section between the folded and unfolded positions.

2. The boom structure of claim 1 including a folding cylinder connected between the support frame and the first boom, and wherein the first boom sensor is located within the folding cylinder.

3. The boom structure of claim 2 including a first fold switch connected to the first boom sensor and to the valve structure, and a second fold switch connected to the sensor switch and the valve structure, the first fold switch controlling movement of the first and second boom sections to the folded position and the second fold switch controlling movement of the boom sections to the unfolded position.

4. The boom structure of claim 1 wherein the hydraulic cylinder includes a barrel and an extendible and retractable rod connected to a piston member movable along the barrel, the switch comprises a magnetic proximity switch sensing the movement of the piston to a preselected position within the barrel.

5. The boom structure of claim 1 further comprising a first operator control switch connected to the first boom sensor, a second operator control switch connected to the sensor switch, the control switches having first and second states, and a control circuit connected to the operator control switches and responsive to the fold signals and the state of the switches to sequentially fold and unfold the first and second boom sections.

6. The boom structure of claim 5 wherein the first operator control switch controls folding of the first and second boom sections, and the second operator control switch controls unfolding of the first and second boom sections.

7. The boom structure of claim 6 wherein the control circuit is connected to the sensor switch and includes relay structure supported by the hydraulic cylinder.

8. The boom structure of claim 5 wherein the control circuit includes relay structure preventing unfolding of the second boom section until the first boom section is unfolded.

9. The boom structure of claim 5 wherein the control circuit includes relay structure preventing folding of the first boom section until the second boom section is folded.

10. A sequentially foldable boom structure for an agricultural sprayer comprising:
    a support frame;
    a first boom section pivotally connected to the support frame and movable between field working and transport positions;
    a hydraulic motor member connected to the first boom for moving the first boom section between the field working and transport positions;
    a first boom sensor responsive to the position of the first boom section relative to the support frame for providing a first fold signal;

a second boom section pivotally connected to the first boom section for movement relative to the first boom section between folded and unfolded positions;

a hydraulic cylinder having a barrel and an extendible and retractable rod connected to a piston member movable along the barrel, the cylinder connected to the second boom section; and control structure connected to the motor member and the hydraulic cylinder for extending and retracting the rod to move the second boom section between the folded and unfolded positions, including a switch located within the hydraulic cylinder and providing a position signal dependent upon the extension and retraction of the rod, and an electrically controlled valve structure responsive to the first fold signal and to the position signal to control the hydraulic cylinder in dependence on the position of the first boom.

11. The boom structure as set forth in claim 10 wherein the control structure includes means for preventing movement of the first boom section from the field working position toward the transport position when the second boom section is in the unfolded position.

12. The boom structure as set forth in claim 10 wherein the control structure includes means preventing movement of the second boom section from the folded position towards the unfolded position when the first boom section is in the folded position.

13. The boom structure as set forth in claim 10 including relay structure preventing movement of the first boom section towards the transport position when the second boom section is in the unfolded position.

14. The boom structure as set forth in claim 13 wherein the relay structure is attached to the hydraulic cylinder.

15. The boom structure as set forth in claim 10 wherein the switch comprises a magnetically operated switch and a magnet located within the cylinder for movement with the rod.

16. The boom structure as set forth in claim 15 wherein the magnet is connected to an end of the rod, and the barrel includes a cavity, the cylinder having a limit position wherein the magnet projects into the cavity, and wherein the magnetically operated switch is threaded into the barrel and into the cavity.

17. Fold cylinder structure for a folding boom having a support frame, a first folding section connected to the support frame, and second folding section pivotally connected to the first section, the fold cylinder structure including:

a first cylinder connected to the first folding section;

a second cylinder connected to the second folding section;

a control circuit connected to the first and second cylinders selectively extending and retracting the cylinders and moving the first folding section between folded and unfolded positions and moving the second section relative to the first section between transport and operating positions; and wherein the control circuit includes a second section sensor connected to the second cylinder and responsive to extension and retraction of the second cylinder to provide a second section position signal, the control circuit responsive to the second section position signal to prevent movement of the first folding section from the unfolded to the folded position when the second folding section is in the operating position.

18. The fold cylinder structure set forth in claim 17 wherein the control circuit further includes a first section sensor connected to the first cylinder and responsive to extension and retraction of the first cylinder to provide a first section fold signal, the control circuit responsive to the first section fold signal to prevent movement of the second folding section from the transport position to the operating position when the first folding section is in the folded position.

19. The fold cylinder structure set forth in claim 18 wherein the control circuit includes activatable operator control switch for selectively controlling the operation of the cylinders to move the folding boom from a compact position wherein the first section is folded and the second section is in the transport position to a fully extended position wherein the first section is unfolded and the second section is in the operating position, and switch structure connected to the sensors and control switch for automatically stopping the folding boom in an intermediate position between the compact and fully extended positions.

20. The fold cylinder structure as set forth in claim 19 wherein substantially all the control circuit except the operator control switch is supported by the cylinders.

21. The fold cylinder structure set forth in claim 20 including housing containing the first and second section sensors and the switch structure, and wherein the housings are attached to the first and second cylinders.

22. The fold cylinder structure set forth in claim 21 wherein the first and section sensors comprise proximity switches internally located in the first and second cylinders.

23. The fold cylinder structure as set forth in claim 17 wherein the second section sensor is located within the second cylinder for protection against environmental contamination.

* * * * *